United States Patent [19]

Petrak

[11] 4,055,437
[45] Oct. 25, 1977

[54] METHOD OF IN SITU FABRICATION OF A MONOLITHIC REFRACTORY LINING

[75] Inventor: Daniel Ralph Petrak, N. Huntington, Pa.

[73] Assignee: Dresser Industries, Inc., Dallas, Tex.

[21] Appl. No.: 780,216

[22] Filed: Mar. 23, 1977

Related U.S. Application Data

[63] Continuation-in-part of Ser. No. 649,286, Jan. 15, 1976, abandoned.

[51] Int. Cl.$^2$ ............................................. C04B 35/02
[52] U.S. Cl. ....................................... 106/64; 106/104
[58] Field of Search ....................... 106/64, 104, 315; 260/30

[56] References Cited

U.S. PATENT DOCUMENTS

| 2,099,176 | 11/1937 | Scripture | 106/104 |
| 3,313,638 | 4/1967 | Konrad | 106/64 |
| 3,563,774 | 2/1971 | Charles | 106/64 |

Primary Examiner—J. Poer
Attorney, Agent, or Firm—Raymond T. Majesko; John N. Hazelwood

[57] ABSTRACT

Method of preparing a batch of non-basic refractory gunning mix for forming a refractory monolith on its situs of use by mixing non-basic refractory aggregate and calcium aluminate cement with from about 0.5 to 25%, on a cement basis, of calcium chloride hydrate and mixing the resulting batch with water to allow gunning.

4 Claims, No Drawings

METHOD OF IN SITU FABRICATION OF A MONOLITHIC REFRACTORY LINING

RELATED APPLICATION

This application is a continuation-in-part of our parent application Ser. No. 649,286 filed Jan. 15, 1976, now abandoned.

BACKGROUND OF THE INVENTION

Monolithic or monolith forming refractories are special mixes or blends of dry granular or stiffly plastic refractory materials, with which virtually joint free linings are formed. They embrace a wide range of mineral compositions and vary greatly in their physical and chemical properties. In various types of furnaces, monolithic refractories are used to advantage over brick construction. By their use, front installation can be made, avoiding delays for the manufacture of special brick shapes. They frequently eliminate difficult brick laying tasks which may be accompanied by weakness in construction. They are of major importance in the maintenance of furnaces. Substantial repairs can be made with a minimum loss of time and in some instances even during operations.

Gunning mixes consist of granular refractory materials specifically prepared for application with air placement guns. Generally, there are two types of gun mixes based on their industrial uses; namely, those of high density and strength characterized by resistance to heat, chemical attack and mechanical abuse and those of lower density and strength designed primarily for insulating purposes. The mixes are sprayed from the guns or "gunned" at high velocity and pressure, forming homogeneous and densely compacted linings essentially free from lamination cracks.

Basically there are two types of air placement guns, the dry and the wet. With the dry gun, the dry mix becomes uniformly moistened with water while it is passing through the nozzle during the gunning operation. For use with the wet gun, the material is mixed with water within the chamber of the gun before it is fed to the nozzle. Gunning mixes are generally furnished in dry form. Some have air setting properties; others are heat setting.

One of the most serious problems in gunning a refractory is the high losses due to refractory material bouncing back off a wall or the site upon which it is being emplaced. The loss is termed "rebound" in the art. Rebound loss which has been as high as 50% and 60%, is not only undesirable from an economic standpoint but also results in significant alteration of the monolithic chemistry which normally decreases refractoriness.

Accordingly, it is an object of the present invention to provide improved methods of in situ fabrication of monolithic refractory linings by gunning.

Another object of the invention is to provide improved methods for gunning refractory material with a relatively low rebound loss.

Still another object of the invention is to provide improved methods of gunning refractory materials wherein the beneficial characteristics of the material are substantially similar to materials of the same chemical composition emplaced by other methods.

In accordance with the present invention, there is provided a method of gunning a refractory material on its situs of use, with a minimum of rebound, to form a refractory monolith. Suitable size graded, non-basic refractory material is prepared and mixed with a calcium aluminate cement. To this refractory mixture is added from about 0.5 to 25%, based upon the weight of the cement, of calcium chloride hydrate. The resulting batch is tempered with sufficient aqueous material to allow gunning and the resulting mixture is gunned on the situs of use. The use of calcium chloride hydrate ($CaCl_2 \cdot 2H_2O$) in gunning mixes has been found to reduce rebound losses as much as 75%.

In a preferred embodiment, the refractory aggregate contains $Al_2O_3$ and $SiO_2$ as major components and the calcium chloride hydrate is present in amounts between about 0.5 and 15%, based on the weight of the cement.

The non-basic refractory aggregate may consist of calcined alumina, tabular alumina, calcined koalin, calcined bauxite, kyanite, pyrophyllite, calcined clays, fire clay, ball clay, combinations thereof and calcium aluminate cement. The calcium aluminate cement may be any of the commercially available ones ranging from high to low purity. An exemplary chemical analysis of the usable calcium aluminate cement is as follows: 0.1% $SiO_2$, 79% $Al_2O_3$, 0.3% FeO and $Fe_2O_3$, 18% CaO, 0.4% MgO and 0.5% total alkalies. Another usable cement typically analyzes: 9.0% $SiO_2$, 39% $Al_2O_3$, 12% $Fe_2O_3$, 39% CaO and 1% MgO.

The following examples are illustrative of the present invention. All parts and percentages are by weight. The majority of the material in each mix was sized and passed through a −4 mesh screen (Tyler Standard Sieve Series). About 60% of the −4 mesh material was +65 mesh and about 40%, −65 mesh.

A plurality of batches of refractory mixture were prepared and size graded. The refractory aggregate contained as major components based on an oxide analysis, approximately 37% $Al_2O_3$ and 39% $SiO_2$ with small amounts of lime, titania, iron oxide, magnesia and alkalies. The mixes contained approximately 67% kaolin, 4% kyanite, 1% amorphous silica, 3% ball clay, 3% pyrophyllite and 22% calcium aluminate cement. To each of the mixes were added the varying percentages of calcium chloride hydrate shown in Table I below along with 5% predampening water except mixes J and K which contained 3.5%. Each of the mixes was gunned on a test panel and the results and physical properties are given in Table I below.

TABLE I

| MIX DESIGNATION | A | B | C | D | E | F | G | H | I | J | K |
|---|---|---|---|---|---|---|---|---|---|---|---|
| Calcium Chloride Hydrate (Cement Basis) ($CaCl_2 \cdot 2H_2O$) | 0 | .23 | .34 | .45 | .91 | 1.82 | 3.64 | 6.82 | 15.0 | 20.0 | 25.0 |
| Moisture, % | | | | | | | | | | | |
| Panel: | 11 | 10 | 11 | 11 | 14 | 12 | 11 | 10 | 11 | 10 | 10 |
| Rebounds: | 4 | 3 | 4 | 6 | 9 | 5 | 9 | 5 | 5 | 6 | 10 |
| Rebounds, % | 24 | 26 | 19 | 12 | 8 | 7 | 8 | 7 | 12 | 10 | 9 |
| Gunning Characteristics | | | | | | | | | | | |
| Water Range: | Very Narrow | Narrow | Narrow | Ave. | Wide | Wide | Wide | Wide | Wide | Wide | Wide |
| Material Flow: | Good | Good | Good | Good | Good | Good | Good | Slight | Good | Good | Good |
| Dusting: | Slight | Slight | Slight | Slight | Slight | Slight | Slight | Slight | Slight | Slight | Slight |

TABLE I-continued

| MIX DESIGNATION | A | B | C | D | E | F | G | H | I | J | K |
|---|---|---|---|---|---|---|---|---|---|---|---|
| Panel Appearance: | Poor | Poor | Ripples | Good | Good | Good | Excel. | Excel. | Excel. | Excel. | Excel. |
| Panel Lime Content: | 4.65 | 4.20 | 4.60 | 4.17 | 4.0 | 4.4 | 4.25 | 4.40 | 6.05 | | |
| Panel Chlorine Content: | 0.0 | 0.1 | 0.1 | 0.1 | 0.1 | 0.1 | 0.3 | 0.6 | 1.23 | | |
| Physical Properties After Drying 18 Hrs. at 230° F | | | | | | | | | | | |
| Bulk Density, pcf (Av. 3): | 138 | 134 | 132 | 132 | 127 | 125 | 127 | 130 | 138 | | |
| Modulus of Rupture, psi (Av. 3): | 1130 | 1280 | 1070 | 1020 | 670 | 670 | 830 | 1000 | 890 | | |
| Cold Crushing Strength, psi (Av. 3): | 5920 | 6330 | 3510 | 3910 | 1900 | 2930 | 3750 | 4460 | 5990 | | |

The results above show that the addition of calcium chloride hydrate to refractory aggregate that is gunned on its situs of use materially reduces the rebound loss as compared to a gunned aggregate without the hydrate addition.

In another example, to a mixture containing 70% tabular alumina and 30% calcium aluminate cement was added 0.67% calcium chloride hydrate, based upon the weight of the cement, the mixture was predampened with 4% water and gunned on a panel. The rebound loss for this mixture was only 13% compared with a 35% loss for an identical mixture without the calcium chloride hydrate addition.

In another example, 70% fireclay was substituted for the tabular alumina in the above example. The mix was predampened and gunned on a panel and had a 13% rebound loss.

Mixes according to the invention may contain from about 5% to 50%, by weight, calcium aluminate cement and the balance refractory aggregate. However, it is preferred that the cement content range between about 10 and 35%, by weight.

The use of calcium chloride hydrate as a gunning aid accelerates the set of the cement and dispenses with the usual aging process.

Having thus described the invention in detail and with sufficient particularity as to enable those skilled in the art to practice it, what is desired to have protected by Letters Patent is set forth in the following claims.

The embodiments of the invention in which an exlusive property or privilege is claimed are defined as follows:

1. In a method of gunning refractory material on its situs of use with a minimum of rebounds to form a refractory monolith, which method includes the steps of preparing a refractory batch comprising non-basic refractory aggregate and calcium aluminate cement and tempering it, the improvement comprising mixing from about 0.5 to 25%, based upon the weight of the cement, of calcium chloride hydrate with the refractory batch and gunning the resulting batch.

2. The method of claim 1, in which the calcium chloride hydrate is present in amounts between about 0.5 and 15%, based upon the weight of the cement.

3. The method of claim 1, in which the refractory aggregrate contains $Al_2O_3$ and/or $SiO_2$ as major components based on an oxide analysis.

4. A method of preparing a batch of non-basic refractory gunning mix for forming a refractory monolith on its situs of use comprising mixing non-basic refractory aggregate and calcium aluminate cement with from about 0.5 to 25%, based upon the weight of the cement, of calcium chloride hydrate and mixing the resulting batch with water to allow gunning.

* * * * *